United States Patent
Maltz et al.

(10) Patent No.: US 8,160,063 B2
(45) Date of Patent: Apr. 17, 2012

(54) DATA CENTER INTERCONNECT AND TRAFFIC ENGINEERING

(75) Inventors: David A. Maltz, Bellevue, WA (US); Albert G. Greenberg, Seattle, WA (US); Parveen K. Patel, Redmond, WA (US); Sudipta Sengupta, Redmond, WA (US); Parantap Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 12/410,745

(22) Filed: Mar. 25, 2009

(65) Prior Publication Data

US 2009/0303880 A1    Dec. 10, 2009

Related U.S. Application Data

(60) Provisional application No. 61/060,040, filed on Jun. 9, 2008.

(51) Int. Cl.
*H04L 12/56* (2006.01)
*H04J 1/16* (2006.01)

(52) U.S. Cl. ......... 370/389; 370/254; 370/386; 370/401

(58) Field of Classification Search ................... 370/389, 370/386, 401, 254
See application file for complete search history.

(56) References Cited

U.S. PATENT DOCUMENTS

| | | | |
|---|---|---|---|
| 5,774,660 A | 6/1998 | Brendel et al. | |
| 7,111,061 B2 | 9/2006 | Leighton et al. | |
| 7,177,270 B2 | 2/2007 | Sim et al. | |
| 7,197,547 B1 | 3/2007 | Miller et al. | |
| 7,881,208 B1 * | 2/2011 | Nosella et al. | 370/242 |
| 8,055,789 B2 * | 11/2011 | Richardson et al. | 709/238 |
| 2004/0128398 A1 * | 7/2004 | Pettey | 709/249 |
| 2006/0251067 A1 | 11/2006 | Desanti et al. | |

OTHER PUBLICATIONS

Written Opinion of the International Searching Authority and International Search Report in International Patent Application No. PCT/US2009/045769.

Albert Greenberg et al., "Towards a Next Generation Data Center Architecture: Scalability and Commoditization," PRESTO'08, Aug. 22, 2008.

IEEE 802.1ah Standard, web page, http://www.ieee802.org/1/pages/802.1ah.html.

Chandra Kopparapu, Load Balancing Servers, Firewalls, and Caches, 2002, John Wiley & Sons Inc., New York, NY, USA.

IEFT Trill Working Group, Trill Status Pages, web page, http://tools.ietf.org/wg/trill/.

(Continued)

*Primary Examiner* — John Pezzlo
(74) *Attorney, Agent, or Firm* — Vierra Magen Marcus & DeNiro LLP (57) ABSTRACT

A system for commoditizing data center networking is disclosed. The system includes an interconnection topology for a data center having a plurality of servers and a plurality of nodes of a network in the data center through which data packets may be routed. The system uses a routing scheme where the routing is oblivious to the traffic pattern between nodes in the network, and wherein the interconnection topology contains a plurality of paths between one or more servers. The multipath routing may be Valiant load balancing. It disaggregates the function of load balancing into a group of regular servers, with the result that load balancing server hardware can be distributed amongst racks in the data center leading to greater agility and less fragmentation. The architecture creates a huge, flexible switching domain, supporting any server/any service, full mesh agility, and unregimented server capacity at low cost.

18 Claims, 7 Drawing Sheets

OTHER PUBLICATIONS

Mikael Lofstrand, Sun's Pattern-Based Design Framework: The Service Delivery Network, Sun BluePrints Online, Sep. 2005, Sun Microsystems. http://www.sun.com/blueprints/0905/819-4148.pdf.

Lucinda Borovik, Networks that Enable the Datacenter as a Service, IDC Analyst Connection, Apr. 2008, http://www.nortel.com/products/02/bstk/switches/collateral/vss_idc_646.pdf.

The High-Performance Data Center: Reducing Data Center Network Complexity and Total Cost of Ownership, Solution Brochure, Juniper Networks, http://www.juniper.net/solutions/literature/brochures/160028.pdf.

Extending Virtualization in the Data Center with Application Infrastructure Virtualization, IBM, Websphere Software, Apr. 2008, ftp://ftp.software.ibm.com/software/webservers/appserv/WebSphere_Virtual_Enterprise_wp.pdf.

InfiniBand in the Internet Data Center, Reliability, Availability and Serviceability, Past, Present and Future, Mellanox Technologies Inc., White Paper, http://www.mellanox.com/pdf/whitepapers/IBIDC_WP_170.pdf.

Daniel Gmach, Workload Analysis and Demand Prediction of Enterprise Data Center Applications, http://www.hpl.hp.com/personal/Lucy_Cherkasova/papers/iiswc2007-cr.pdf.

Data Center: Load Balancing Data Center Services, Solutions Network Reference Design, Mar. 2004, Copyright 2004 Cisco Systems, http://www.cisco.com/en/US/solutions/ns340/ns414/ns742/ns656/net_design_guidance0900aecd800eb95a.pdf.

N.G. Duffield, A Flexible Model for Resource Management in Virtual Private Network, ACM SIGCOMM Computer Communication Review, Oct. 1999, pp. 95-108, vol. 29, Issue 4, ACM, New York, NY, USA. http://citeseerx.ist.psu.edu/viewdoc/download;jsessionid=5672587E554E2736C9CCA84102A4B63D?doi=10.1.1.44.9104&rep=rep1&type=pdf.

Michael Isard, Autopilot: Automatic Data Center Management, Microsoft Research, http://research.microsoft.com/pubs/64604/osr2007.pdf.

Changhoon Kim, Building Scalable Self-Configuring Networks with SEIZE, Princeton University Computer Science Technical Report TR-801-07, Oct. 2007, http://www.cs.princeton.edu/~chkim/Research/SEATTLE/NSDI08/seize-nsdi.pdf.

M. Kodialam, A Versatile Scheme for Routing Highly Variable Traffic in Service Overlays and IP Backbones, Proceedings of the 25th IEEE International Conference on Computer Communications, INFOCOM 2006, Apr. 2006, pp. 1-12. http://ieeexplore.ieee.org/stamp/stamp.jsp?arnumber=4146834&isnumber=4146653.

Andy Myers, Rethinking the Service Model: Scaling Ethernet to a Million Nodes, http://www.cs.cmu.edu/~acm/papers/myers-hotnetsIII.pdf.

Radia Perlman, RBridges: Transparent Routing, IEEE INFOCOM 2004, Sun Microsystems Laboratories, http://www.ieee-infocom.org/2004/Papers/26_1.PDF.

Virtual Router Redundancy Protocol (VRRP), White Paper, Image Stream Internet Solutions 2004, Jun. 9, 2004, http://www.imagestream.com/VRRP_WhitePaper.PDF.

Hong Yan, Tesseract: A 4D Network Control Plane, http://www.cs.cmu.edu/~4D/papers/tesseract-nsdi07.pdf.

Rui Zhang-Shen, Designing a Predictable Internet Backbone Network, Computer Systems Laboratory, Stanford University, http://citeseerx.ist.psu.edu/viewdoc/download?doi=10.1.1.59.791&rep=rep1&type=pdf.

IEEE 802.1ah Standard, web page, http://www.ieee802.org/1/pages/802.1ah.html, retrieved from Internet Feb. 12, 2009, last modified Nov. 13, 2008.

IEFT Trill Working Group, Trill Status Pages, web page, http://tools.ietf.org/wg/trill/, retrieved from Internet Feb. 12, 2009, last updated Sep. 1, 2008.

The High-Performance Data Center: Reducing Data Center Network Complexity and Total Cost of Ownership, Solution Brochure, Juniper Networks, Nov. 2008 http://www.juniper.net/solutions/literature/brochures/160028.pdf.

InfiniBand in the Internet Data Center, Reliability, Availability and Serviceability, Past, Present and Future, Mellanox Technologies Inc., 2004 White Paper http://www.mellanox.com/pdf/whitepapers/IBIDC_WP_170.pdf.

Daniel Gmach et al., Workload Analysis and Demand Prediction of Enterprise Data Center Applications, Proceedings of the 2007 IEEE 10th International Symposium on Workload Characterization, Sep. 2007 http://www.hpl.hp.com/personal/Lucy_Cherkasova/papers/iiswc2007-cr.pdf.

Michael Isard, Autopilot: Automatic Data Center Management, Microsoft Research, Apr. 2007 http://research.microsoft.com/pubs/64604/osr2007.pdf.

Andy Myers, Rethinking the Service Model: Scaling Ethernet to a Million Nodes, 2004 http://www.cs.cmu.edu/~acm/papers/myers-hotnetsIII.pdf.

Hong Yan, Tesseract: A 4D Network Control Plane, Proc. Networked Systems Design and Implementation, 2007 http://www.cs.cmu.edu/~ 4D/papers/tesseract-nsdi07.pdf.

Rui Zhang-Shen, Designing a Predictable Internet Backbone Network, Computer Systems Laboratory, Stanford University, 2004 http://citeseerx.ist.psu.edu/viewdoc/download?doi=10.1.1.59.791&rep=rep1&type=pdf.

* cited by examiner

DATA CENTER INTERCONNECT AND TRAFFIC ENGINEERING

CROSS REFERENCE TO RELATED APPLICATION

The present application claims priority to provisional patent application No. 61/060,040, to Maltz et al., entitled "DATA CENTER INTERCONNECT AND TRAFFIC ENGINEERING," filed on Jun. 9, 2008, which application is incorporated by reference herein in its entirety.

BACKGROUND

Applications hosted in today's data centers suffer from internal fragmentation of resources, rigidity, and bandwidth constraints imposed by the architecture of the network connecting the data center's servers. The current conventional architecture statically maps web services to Ethernet VLANs, each constrained in size to a few hundred servers owing to control plane overheads. The IP routers used to span traffic across VLANs and the load balancers used to spray requests within a VLAN across servers are realized via expensive customized hardware and proprietary software. Expensive IP router ports thus become the bottleneck for any-rack-to-any-rack server connectivity, thus constraining the traffic for many data intensive applications (e.g., data mining, map/reduce computations, distributed file systems, blob stores). Further, the conventional architecture concentrates traffic in a few pieces of hardware that must be frequently upgraded and replaced to keep pace with demand—an approach that directly contradicts the prevailing philosophy in the rest of the data center, which is to scale out (adding more cheap components) rather than scale up (adding more power and complexity to a small number of expensive components). This concentration of traffic into a small number of network routers and switches also puts the network at risk of failures and outages, as failure of this small a number of components overcomes the redundancy built into the system and leads to an outage. Commodity switching hardware is now becoming available with very high port speeds at very low port cost, making this the right time to redesign the data center networking infrastructure.

A data center is comprised of both server and networking components, where the distance between the components is typically less than a millisecond of speed of light propagation time (i.e., crossing a handful of switches at 1 Gbps speeds or greater). The server portion of the infrastructure is now far down the road of commoditization—high-end enterprise-class servers have been replaced by large numbers of low cost PCs. Innovation in distributed computing and systems management software have enabled the unreliability of individual servers to be masked by the aggregated reliability of the system as a whole. The running theme is "scaling out instead of scaling up," driven by the economics of PC commoditization. Commodity parts are characterized by: wide availability, standardization, and drivers for increased capabilities (e.g., 1 Gbps, 10 Gbps technology already available, 100 Gbps technology now emerging).

The network portion of the data center infrastructure presents the next frontier for commoditization. The increase in the number of servers that need to be interconnected has stretched the limits of enterprise networking solutions so much that current architectures resemble a spectrum of patches and workarounds for protocols that were originally intended to work in enterprise networks orders of magnitude smaller.

Figure 1:
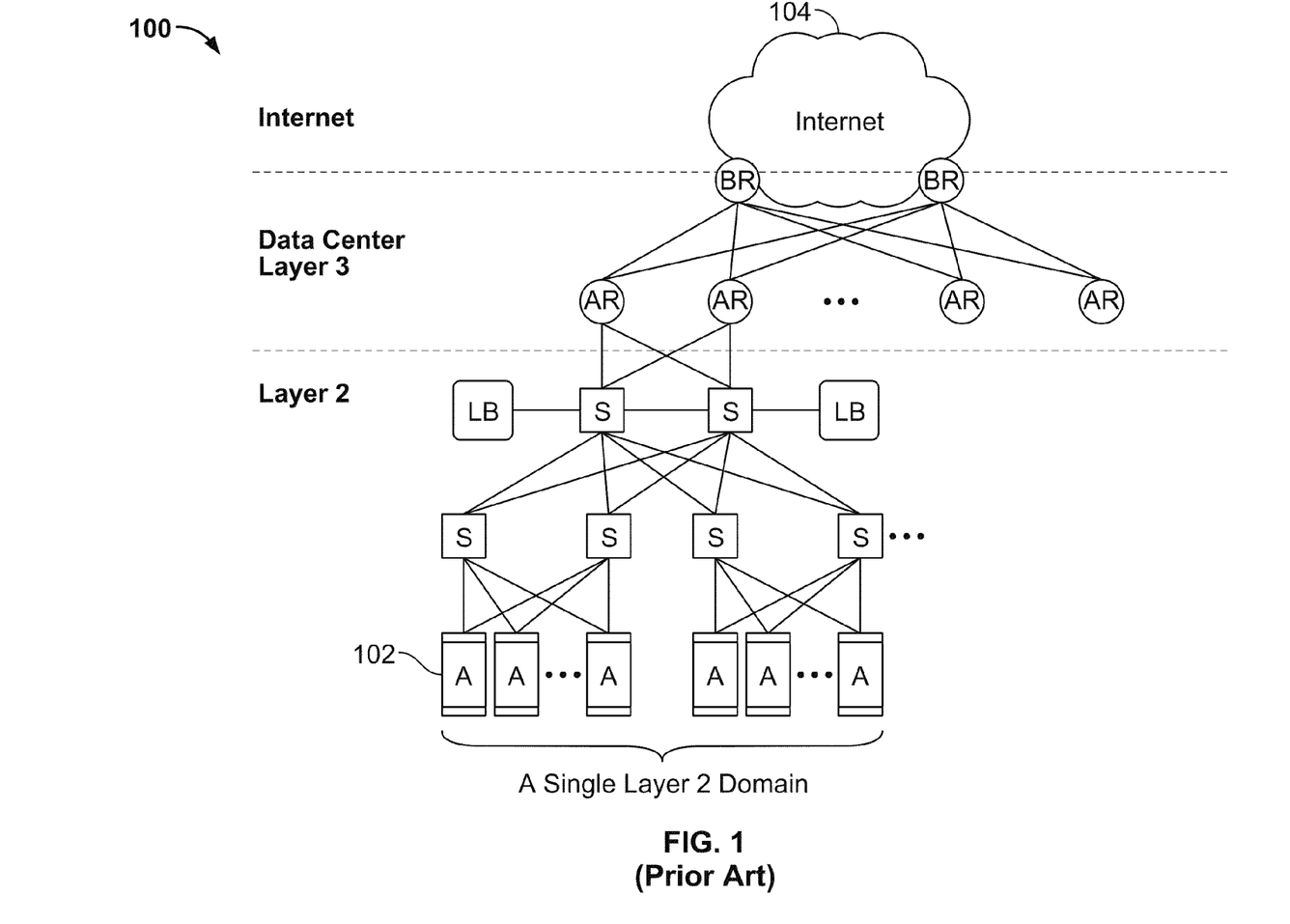
FIG. 1 is a diagram of a conventional network architecture for data centers.

Some challenges and requirements of conventional data centers will now be explained with reference to FIG. 1, which shows a conventional architecture 100 for a data center, taken from a recommended source. See "Cisco systems: Data center: Load balancing data center services, 2004", which is hereby incorporated by reference in its entirety. Multiple applications run inside the data center, but typically each application is hosted on its own set of (potentially virtual) server machines 102 with a single organization owning and controlling the activity inside the data center. Requests from the Internet 104 are typically sent to a publicly visible and routable Virtual IP address (VIP), and there are one or more VIPs associated with each application running in the data center.

Requests arriving from the Internet are IP (layer 3) routed through border routers (BR) and access routers (AR) to a layer 2 domain based on the destination VIP address. The VIP is configured onto the two load balancers (LB) connected to the top switches (S), and complex mechanisms are used to ensure that if one load balancer fails, the other picks up the traffic. See "Virtual router redundancy protocol (VRRP)" by E. R. Hinden, which is hereby incorporated by reference in its entirety. For each VIP, the load balancers are configured with a list of Direct IP addresses (DIPs), which are the private and internal addresses of physical servers 102 in the racks below the load balancers. This list of DIPs defines the pool of servers that can handle requests to that VIP, and the load balancer spreads requests across the DIPs in the pool.

As the number of servers required in the data center grows, additional pairs of switches and associated racks are added to the layer 2 domain, as shown in the figure. Layer 2 subnets are constrained in size to a few hundred servers owing to the overheads of broadcast and control plane traffic, so VLANs are configured on the Layer 2 switches to divide up the domain into multiple layer 2 subnets, one sub-net per VLAN. When the layer 2 domains eventually hits limits associated with large Ethernet domains (e.g., VLAN exhaustion, broadcast/control traffic) at a size of about 4,000 servers, additional layer 2 domains are created and connected to other pairs of access routers.

The conventional approach has the following problems:

Fragmentation of resources: Popular load balancing techniques, such as destination NAT (or half-NAT) and direct server return, require that all DIPs in a VIP's pool be in the same layer 2 domain. See "Load Balancing Servers, Firewalls, and Caches" by C. Kopparapu, which is hereby incorporated by reference in its entirety. This constraint means that if an application grows and requires more servers, it cannot use available servers in other layer 2 domains—ultimately resulting in fragmentation and under-utilization of resources. Load balancing via Source NAT (or full-NAT) does allow servers to be spread across layer 2 domains, but then the servers never see the client IP, which is often unacceptable because servers need to log the client IP for regulatory compliance and data mining.

Poor server to server connectivity: The hierarchical nature of the network means that for servers in different layer 2 domains to communicate, traffic must go through the layer 3 portion of the network. Since layer 3 ports are significantly more expensive then layer 2 ports, these links are typically oversubscribed (e.g., the capacity of the links between access routers and border routers is less than the sum of the output capacity of the servers connected to the access routers). The result is that the bandwidth available between servers in different parts of the data center can be quite limited. This creates a serious global optimization problem as all servers belonging to all applications must be placed with great care to ensure the sum of their traffic does not saturate any of the network links, and achieving this level of coordination between applications is difficult in practice. The lack of sufficient capacity between servers also fragments the pool of servers. For example, when an application running in the data center needs more servers to handle its workload, unused servers located elsewhere in the data center cannot be placed into service if there is insufficient capacity between them and the existing application servers.

Proprietary hardware that scales up, not out: The load balancers in the conventional architecture are used in pairs in a 1+1 resiliency configuration. When the load becomes too great for the load balancers, operators replace the existing load balancers with a new pair having more capacity, and it is impossible to add a single load balancer to obtain more capacity.

SUMMARY

The present system relates to a simple design for scaling out data center networking. The system design uses a simple mesh-like architecture, commodity switches, modifications to the control plane to control protocol overheads and to support flexible traffic engineering through multipath routing. It disaggregates the function of load balancing into a group of standard servers, with the result that load balancing server hardware can be distributed amongst racks in the data center leading to greater agility and less fragmentation. The architecture creates a huge, flexible switching domain, supporting any server/any service, full mesh agility, and unregimented server capacity at low cost.

In embodiments, the system includes an interconnection topology for a data center having a plurality of servers and a plurality of nodes of a network in the data center through which data packets may be routed. The system uses a routing scheme where the routing is oblivious to the traffic pattern between nodes in the network, and wherein the interconnection topology contains a plurality of paths between one or more servers.

Contrasting with the conventional architecture, the present architecture meets the following challenges:

Placement anywhere: The architecture allows any server anywhere in the data center to be a part of the pool of servers behind any VIP, so that server pools can be dynamically shrunk or expanded. That is, the servers and the DIPs behind each VIP may be placed anywhere in the data center.

Server to server bandwidth: Many applications require extensive computation inside the data center, so the architecture optimizes bandwidth between every pair of servers in the data center, regardless of where they are located.

Commodity hardware that scales out: As more capacity is needed, the present system makes it easier to add more individual components than replace existing components with newer, higher capacity models. This requires that the architecture supports a resiliency model where all components are active, and where a failure of 1 out of n components removes just 1/n-th of the total capacity.

Support any number of servers, with the same architecture: Data centers of the future will provide intensive internal communications between roughly 100,000 servers. The present system allows efficient load balancing and communication between servers of this volume. Information storage and messaging for switching and load balancing scales linearly with the number of servers. Network hardware and messaging scales as n log n with the number of network elements.

As explained below, the present system meets these challenges by leveraging the programmability of servers, switches with standard routing and encapsulation capabilities, and certain useful data plane primitives implemented in the switch hardware.

DETAILED DESCRIPTION

The present system will now be explained with reference to FIGS. 2-9. Given the availability of commodity switching hardware with 1 Gbps ports below $100 and falling to $10, 10 Gbps ports falling below $1,000 to $100, and with 40 Gbps and 100 Gbps on the verge of standardization, the time is right to redesign the data center networking infrastructure. The following provides a system for commoditizing the networks of data centers used for "cloud" services where large numbers of servers cooperatively handle huge workloads (e.g., web searching). Features of the present system include:

Traffic Engineering on a Mesh: Valiant load balancing (VLB) is used on a mesh of commodity switches to realize a hot-spot free core fabric that supports arbitrary traffic patterns in an oblivious manner (i.e., it accommodates any traffic matrix permitted by the server interface cards). The role of the switches simplifies to fast forwarding, with much of the complexity in scaling and control shifted to the servers.

Scale to Huge Layer 2 Domain: Packets are directed between servers using flat addresses, so that any address can be used by any server regardless of where in the data center it is physically connected. As used herein, a flat address is one that indicates only the identity of a server or destination and not the location at which the server or destination is connected to the network. Flat addresses are distinguished from other addresses which are topologically significant, meaning that the address not only identifies the server or destination, but also indicates where the server or destination is connected to the network. The network appears to the servers as a single huge layer 2 domain, but techniques are used so this domain can scale up to 100 thousand servers or more.

Disaggregated Load Balancing Functionality: load balancing is implemented as an integrated part of packet forwarding, so that traffic to any IP address can be spread across multiple servers using consistent hashing.

In the description below, the terms "data packet" and "packet" are used to refer to a sequence of data sent by a server that begins with a header. That header might be either layer 2 or layer 3, and the following data may include additional headers. In the description below, the terms "router" and "switch" are used interchangeably to refer to a component that receives packets on at least one port and transmits packets out one or more ports in response.

Architecture

Figure 2:
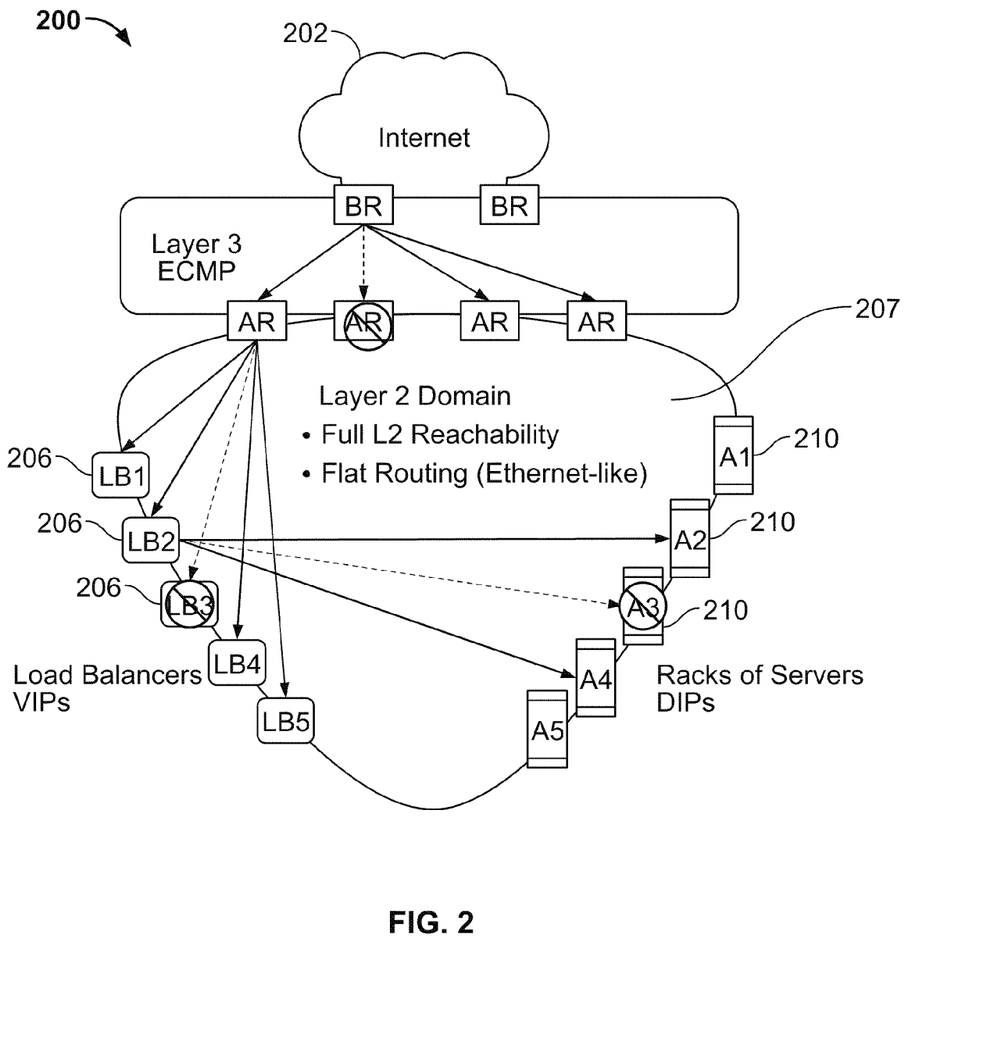
FIG. 2 is a diagram of an overview of the architecture of the present system showing all servers connected by a network with no oversubscribed links.

FIG. 2 provides an overview of architecture 200 according to the present system. Two features are the network that connects together all 100,000 servers inside the data center in a single layer 2 domain and the flexible ways in which requests can be distributed over pools of servers. The architecture is explained below, followed by subsections providing more detail on each point.

The network 207 is designed to have full reachability with no oversubscribed links, meaning that any server can communicate with any other server at the full 1 Gbps rate of the servers' network interfaces. The support for a flat address space efficiently supports the form of mobility seen in data centers: migration of images or virtual machines from one physical machine to another, through registration of the new location. The result is transparent to VIP/DIP mappings on load balancers and security policies on application servers, which operate at layers 3-7.

The layer 3 portion of the network of the present system uses Equal Cost MultiPath (ECMP) to spread the requests received from the Internet 202 equally over all border routers (BR) and access routers (AR). As the requests enter the layer 2 domain, the access routers spread the requests equally over the set of servers 206 acting as load balancers for the destination VIP using consistent hashing. Through configuration or switch programmability, weighted multipath rather than equal cost multipath can be used. Finally, the load balancers spread the requests using an application-specific load distribution function over the pool of servers 210, identified by their DIPs, that implement the application functionality.

The ability of the present system to spread the packets destined to an IP address over a set of servers 206 means that load balancers can be disaggregated—that is, built from commodity servers instead of specialized high-throughput hardware. As the offered load begins to overwhelm the existing load balancers, additional servers 206 can be provisioned as load balancers to dilute the load. Additionally, using commodity servers as load balancers enables them to be fully programmable, with their algorithms tunable to particular data center applications rather than making do with the algorithms vendors provide in firmware.

As indicated in FIG. 2, the failure of any access router, load balancer, or server does not cause long term harm to the functioning of the data center. A health service continually monitors the liveness of each server, and when a problem is detected that server is taken out of the rotation pool and new requests are no longer sent to it. (Both control and management plane realizations are possible. See, for example, "Autopilot: Automatic data center management" by M. Isard, which is hereby incorporated by reference in its entirety).

Available Components

In designing a data center network of the present system, it is desirable to use low-cost switches for two reasons. The first reason is economics. Low-cost switches reduce the total cost of the network. The second reason is the redundancy model. Using multiple low-cost switches enables an n+m redundancy model with graceful degradation under failure. While low-cost switches lack many of the packet handling features of more expensive switches or routers, the present architecture shows how switches having a forwarding plane implemented in hardware but with programmable control plane software are sufficient to implement an elegant and performant design. Low-cost switches have the following characteristics that impact the design of a data center network.

Encapsulation/decapsulation mechanisms: Encapsulation allows a switch to carry one type of packet inside another, with the forwarding of the overall packet determined by the outermost headers. Decapsulation allows a switch that receives an ecapsulated packet addressed to it to remove the outermost header and then forward the packet using its normal forwarding rules, but applied to the next outermost header. As shown in the sections that follow, having switches that implement this primitive is valuable, as it allows software on the end-servers to orchestrate sophisticated network behavior, and server software can be written, modified, and deployed more easily than software on the switches. Low-cost switches often implement a plurality of ecapsulation/decapsulation mechanisms. A first example is IP-in-IP encapsulation (defined by Request For Comments 2003, which is hereby incorporated by reference in its entirety), where an IP packet is encapsulated inside another IP header. A second example is VLAN encapsulation, where a packet is encapsulated inside an 802.1 header containing a VLAN tag. A third example is MAC-in-MAC tunneling (set forth in IEEE 802.1ah, which is hereby incorporated by reference in its entirety) defines a layer 2 analogue to IP-in-IP encapsulation. When a switch receives a packet sent to its own MAC address, it removes the outermost MAC header, and, if there is another MAC header inside, forwards the packet towards the MAC destination address in the inner header. Today 802.1ah is implemented in "carrier Ethernet" switches, but it is expected to become widely available.

Limited forwarding table sizes: Due to the cost of large on-chip memories, low-cost switches often have small forwarding tables. For example, while a few switches support over 100K MAC entries in their forwarding tables, the vast majority of switches support only 16,000 MAC entries or 12,000 IP route entries. Since a data center with 100K servers is targeted, it is clear that not every switch can hold a route to each server.

Node degree: Low-cost switches are available in a variety of node degrees, so multiple types of switches may be used. For example, a top-of-rack (TOR) switch that aggregates the 20 1-Gbps links coming from the 20 servers in each rack onto 2 10-Gbps uplinks. As a second example, a "core" switch with 144 ports of 10-Gbps. Switches in these classes are available from vendors such as Broadcom, Arastra, Woven Systems, Fulcrum Microsystems, Nortel, and Extreme.

Server-to-Server Forwarding

The ability to forward packets between servers in the data center is a basic aspect of the present system, and other functions are built on top of it. There are three main issues to solve in providing forwarding.

Forwarding scalability: the present system must connect 100,000 servers using a network built of switches that can only store 16,000 forwarding entries each. The present system cannot allow the switches to see the destination address of every server.

The solution of the present system is to have the sending server encapsulate its packets to the destination's top-of-rack switch, so that switches need only store forwarding entries for other switches and their own directly connected servers. There are multiple embodiments possible. In one embodiment, the L2 packet sent by the server is encapsulated in a MAC-in-MAC packet. In another embodiment, the L3 packet sent by the server is encapsulated in an IP-in-IP packet. In further embodiments, the packet might be encapsulated in a VLAN or Q-in-Q (VLAN in VLAN). It should be understood that "top-of-rack switch" is used to describe a switch to which a server is connected. This switch is often found located in the same rack as the server, but the location of the switch is not significant and it can, if desired, be located elsewhere in the data center or integrated into a package with the server(s) (as in a blade server configuration where a package consists of a plurality of servers or central processing units connected by a switch).

ARP scalability: The goal is to create a single large layer 2 domain that supports flat addresses and connects all servers. As described above, a failure of the conventional design is that each server uses the Address Resolution Protocol (ARP) to resolve the address of the other servers with which it wishes to communicate. The broadcast packets used by the ARP protocol cause unacceptable overheads that limit the size of the layer 2 domain to far less than the number of servers desired (e.g., 100,000 servers). The solution of the present system is to intercept the ARP packets generated by the server before they leave the server, and instead sending requests to a directory service. The directory service returns the addresses that the sending server must use (e.g., the MAC or IP address of the destination server, and/or the MAC or IP address of the top of rack switch to which the destination server is connected, and/or the intermediate switch or switches).

Traffic engineering: Without knowing the traffic patterns of the applications that will run over it, the present system must support any traffic matrix in which no server is asked to send or receive more traffic than the 1-Gbps its network interface allows (known as the hose traffic model. See "A flexible model for resource management in virtual private network" by N. G. Duffield, P. Goyal, A. G. Greenberg, P. P. Mishra, K. K. Ramakrishnan, and J. E. van der Merwe, which is hereby incorporated by reference in its entirety).

The solution of the present system is to use Valiant load balancing (VLB), an oblivious routing strategy known to handle arbitrary traffic variations that obey the hose model. See "A Versatile Scheme for Routing Highly Variable Traffic in Service Overlays and IP Backbones" by M. Kodialam, T. V. Lakshman, J. B. Orlin, and S. Sengupta, and "Designing a Predictable Internet Backbone Network" by R. Zhang-Shen and N. McKeown, which documents are both hereby incorporated by reference in their entirety. VLB requires that every packet sent across the network first "bounce" off a randomly chosen intermediate switch before being forwarded to its destination. The present system implements VLB by adding an additional encapsulation header to packets that directs them to a randomly chosen switch. Use of a congestion control mechanism (e.g., TCP in IP networks or QCN in Ethernet networks) converts arbitrary offered traffic demands into traffic matrix loads close to those admissible under the hose model—traffic sent or from a port at the network edge does not exceed the port speed. In combination, congestion control, VLB, and the appropriate switch topology, assure uniform high throughput.

Load spreading: In building data center applications it is frequently useful to be able to spread requests across a set of servers.

The solution of the present system is to support load spreading as a part of basic forwarding. Whenever the present system has a packet to send to an IP address I, it is prepared for that IP I address to resolve to a list of MAC or IP addresses, these addresses being associated with other servers each of which is appropriate for processing packets originally sent by the application to IP address I. In this case, the sender may use consistent hashing to select the address to which the packet is sent.

Taken together, these solutions enable a large layer 2 domain with the traffic oblivious properties of VLB while, for example, using switches with small, and forwarding tables. The load spreading ability of the network, created by the ability of a single IP address to resolve to a plurality of addresses, means that load balancing can be implemented using the servers themselves, without the need for specialized load balancing hardware.

Obtaining Path Information From the Directory

When the application running on a server 210 presents its network stack with a packet to send to an IP address, the server needs two pieces of information before it can create and send a packet. As explained above, it must have the list of addresses for the servers responsible for handling that IP address, and the address of the top-of-rack switch where each of those servers is connected. It also needs a list of switch addresses from which it will randomly pick a switch to "bounce" the packet off of.

Servers obtain these pieces of information from a directory service maintained by the present system. The means by which the directory service is populated with data is explained below.

Figure 3:
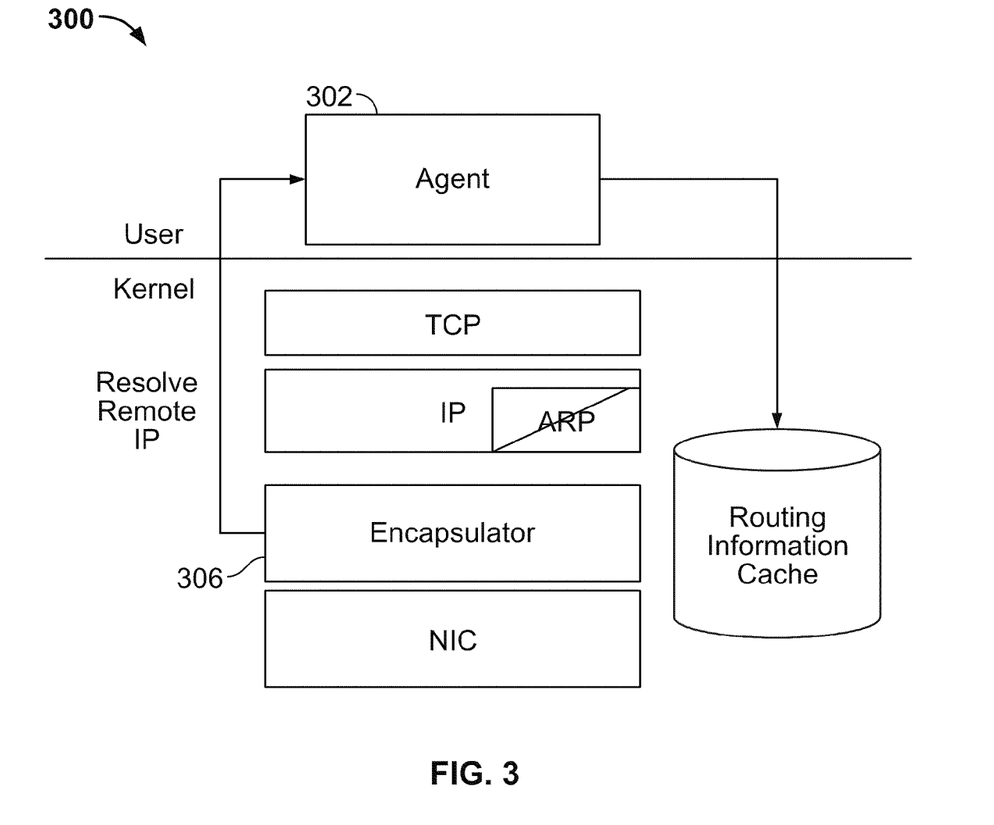
FIG. 3 is a diagram of a networking stack of a host.

FIG. 3 shows the networking stack 300 of a server 210 in the present system. The traditional ARP implementation has been disabled and replaced with a process, which may run in user or kernel mode, referred to as agent 302, and a new virtual interface, called the encapsulator 306, has been added to encapsulate outgoing packets. These changes are completely transparent to applications. When the encapsulator 306 receives a packet from the IP network stack, it computes a flow id for the packet and examines its cache of active flows for a matching entry. If there is no entry, it queues the packet and sends a request to the agent 302 to look up the remote IP using the directory service.

Once the directory service returns the address(es) to which the IP address resolves, the address(es) of the top of rack switches to which those server(s) are connected, and the set of VLB intermediate switches to use, the encapsulator 306 chooses a destination address (and its corresponding top-of-rack switch address) and a VLB intermediate node for the flow and caches this mapping. The server may choose a different intermediate node for every flow, thus spreading its load among all VLB intermediate nodes while not causing TCP packet reordering. If the directory service maps a remote IP address to a list of addresses, servers will choose a different address for each flow to the remote IP, thereby implementing load spreading.

Figure 4:
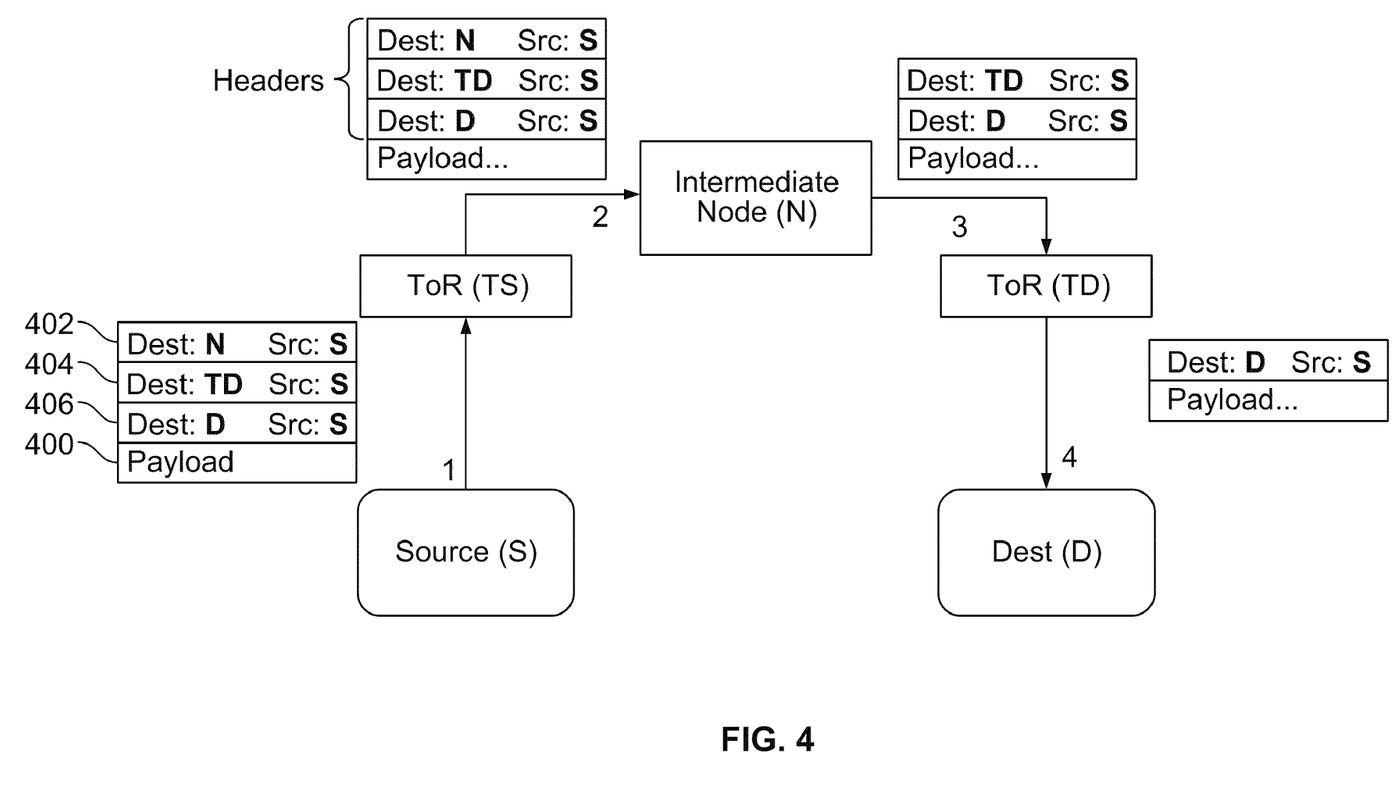
FIG. 4 is an exemplary diagram of a packet processing when packets go from one server to another in the same data center.

With the information from the entry in the flow cache, encapsulating and forwarding a packet is straight-forward. FIG. 4 shows how IP packets 400 are transmitted with three headers. The outermost header 402 has the selected intermediate node (N) as the destination, the middle header 404 has the target's top-of-rack switch (TD) as the destination, and the innermost header 406 has the address of the ultimate destination (D). It is understood that a variety of header encapsulation protocols can be used, including MAC, VLAN or IP. The sending server's top-of-rack switch (TS) forwards the packet towards the VLB intermediate node, which upon receiving the packet removes the outer header and forwards the packet to the destination's top-of-rack switch. The process repeats, with the top-of-rack switch forwarding a normal Ethernet packet with a single header towards the destination server.

Prior work, such as SEIZE (see "Building scalable self-configuring networks with SEIZE" by C. Kim, M. Caesar, and J. Rexford, which is hereby incorporated by reference in its entirety), also use an intermediate switch to "bounce" off traffic. However, a major difference between the present system and SEIZE is that SEIZE routes all traffic to a given destination through the same intermediate node, while the present system spreads the traffic across all available intermediate nodes to obtain the benefits of VLB.

External Connections

Figure 5:
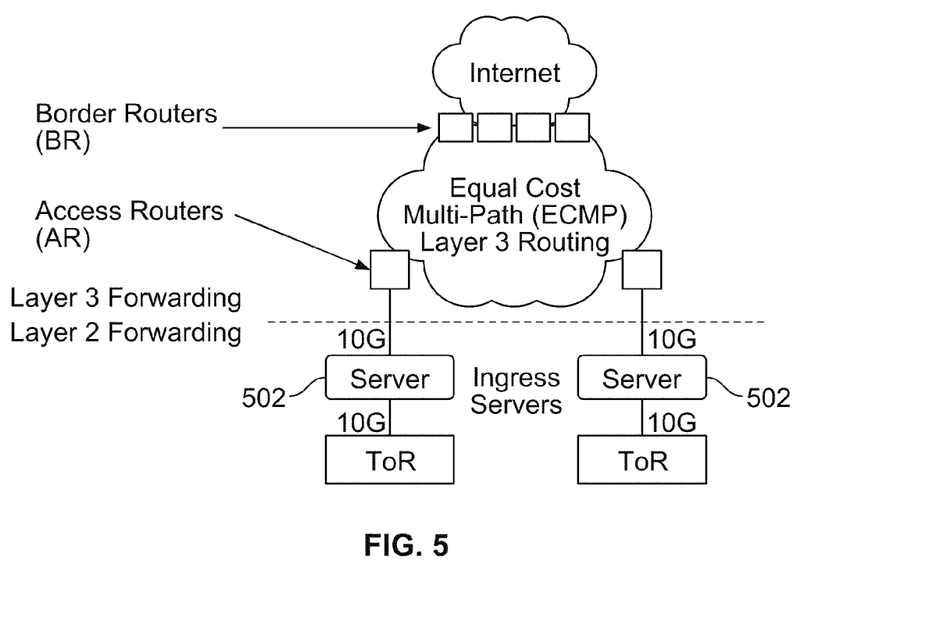
FIG. 5 is a diagram of a network path for connections across the Internet.

FIG. 5 shows the network path for connections that originate or terminate outside the data center. External traffic enters and exits the data center through Border Routers (BR). The Border Routers are connected to a set of Access Routers (AR) through a layer-3 Equal Cost Multi-Path (ECMP) routing configuration.

As described above, traffic is routed inside the data center by address resolution through the directory service of the present system and encapsulation of Ethernet packets at the source. Since the Access Routers may not be modified to do source routing, all the external traffic may be routed through special servers 502, called Ingress Servers, that act as gateways to the data center.

Each Ingress Server has two network interfaces—one is directly connected to an Access Router and the other is connected to the data center network via a top-of-rack switch. For packets from the Internet, the Ingress Server 502 takes packets from the Access Router, resolves internal IPs using the directory service of the present system and forwards traffic inside the data center using the same server to server forwarding mechanisms described earlier. The directory service maps the IP address of the layer 2 domain's default gateway to the MAC address of the ingress servers, so packets headed to the Internet flow out through them to the access routers.

In an alternate embodiment, an ingress server might have one network interface, with that interface connected to a top-of-rack switch.

Load Balancing

Many data center applications require the ability to distribute work over a pool of servers. In some cases, the work originates from clients in the Internet, in others cases, from servers inside the data center. The present system provides mechanisms that support the most common types of work distribution.

Load spreading: When the objective is to have requests spread evenly over a pool of servers and the servers should see the IP address of the client as the source address of the request, the load spreading primitive offered by server-to-server forwarding according to the present system is sufficient. All servers in the pool would be configured with the VIP associated with the pool as well as their own IP address. The directory service will then maintain the addresses of all servers in the pool associated with the VIP. In response to a given request for the VIP, and consistent hashing will be used to pick the server for each request.

Load balancing: When the objective is to place middle boxes in front of the actual servers, the present system may use the approach shown in FIG. 2. The VIP is configured onto all the middle boxes, causing the ingress servers to use consistent hashing and the load spreading method described above to spread requests evenly across the middle boxes. By spreading the load across multiple middle boxes in this manner, the present system supports an N+1 failover configuration, as opposed to the 1+1 failover configuration used by the conventional architecture.

The middle boxes are free to implement any function the application desires. For example, the middle box might implement a load balancer that rewrites the source and destination IP addresses to spread requests over a second pool of servers using some workload or request-sensitive logic, or it might do deep packet inspection to validate the request before sending it on to an application server.

As another example, the middle box might terminate incoming TCP connections and decrypt SSL connections contained in them, thereby offloading the work from the application servers. This example also illustrates why load spreading must use consistent hashing—ECMP might direct packets that are part of the same TCP connection to several different access routers and ingress servers. Yet, it is critical that all those packets end up being sent to the same middle box, and consistent hashing will ensure that happens. An alternative to consistent hashing is per-flow state synchronization among nodes.

Switch Topology

There are many physical topologies by which the switches making up the layer 2 domain might be connected, but this section provides one concrete example of a topology that interconnects≈100,000 servers and is particularly well suited for Valiant load balancing.

Figure 6:
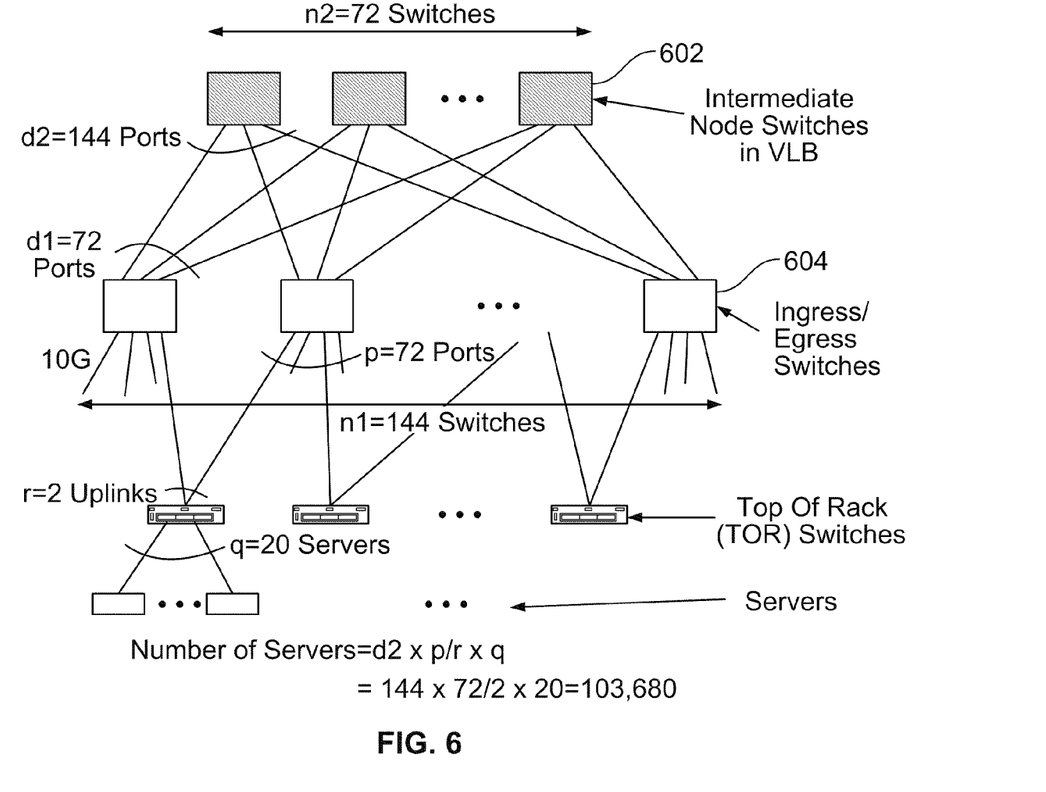
FIG. 6 is a diagram of an example topology for switches connecting 103,680 servers.

As shown in FIG. 6, each top-of-rack switch 602 has 2 10-Gbps ports on the network side that connect to two different core ingress-egress switches 604 for fault-tolerance. There are $n_1=144$ such ingress-egress switches 604 in one embodiment. These ingress-egress switches have no links between them, but each of them connects, through a 10-Gbps port, to every intermediate switch 602, of which there are $n_2=72$. This topology is an adaptation of a Clos network, and is particularly well suited for use in VLB, as it adds minimal stretch (extra hops) to the paths taken by flows. In addition, every flow can choose its intermediate switch 602 to bounce off of from among the same set of switches 602.

Control Plane

The control plane of the present system has at least two responsibilities: first, maintaining the forwarding tables in the switches; and second, operating a directory service that tracks the port at which every server is connected to the network, as well as the server's IP and MAC addresses.

The top-of-rack switches may be programmed to track the IP and MAC addresses of the servers directly connected to them, and announce this information in a Link-State Advertisement (LSA). Alternatively, the provisioning system that assigns servers to a data center application may record the MAC address, IP address, and TOR of each server as it assigns them.

Maintaining Forwarding Tables: As set forth above, the present system requires that every switch have a forwarding table with an entry for every other switch. Any technique that can compute routes among the roughly 5K switches in the data center could be used. In one possible embodiment, the switches run a link-state routing protocol among themselves. In an alternate embodiment, logically-centralized routing may be used based on the 4D architecture to compute the forwarding tables for the switches and recompute the tables as needed in response to failures. Tesseract (see Tesseract: A 4D network control plane by H. Yan, D. A. Maltz, T. S. E. Ng, H. Gogineni, H. Zhang, and Z. Cai, which is hereby incorporated by reference in its entirety) demonstrates that centralized control implemented using decision elements scales easily to manage 1000 switches, so computing routes for the roughly 5,000 switches in a 100,000 server data center may be accomplished.

To eliminate the scaling problems caused by broadcast traffic, the switches may be programmed to forward any packet for which they do not have a forwarding entry to the decision elements. This traps any broadcast packet a server might send (e.g., DHCP requests), and allows the decision element to decide how to handle it. To prevent the transparent learning algorithms from altering the forwarding tables created by the decision element, learning on the switches may be disabled. In an alternate embodiment, other agents on the switches may be used to intercept and forward broadcast traffic. For example, DHCP relay agents on the switches might be used to forward DHCP requests to the DHCP servers. In yet another embodiment, the agent on each server might intercept the broadcast or multicast packets the server attempts to send and redirect these to a decision element or directory server for handling.

Maintaining a Directory Service: There are many ways to implement the directory service required by the present system, but one such method is as follows: the decision elements that run the control plane offer a directory service that maps the IP address of a server to a list of (server address, top-of rack switch address) tuples and a list of intermediate node addresses. This design is simple to implement as much of the information needed to populate the directory service comes from the LSAs obtained from the top-of-rack switches and is already available to the decision elements.

When a server crashes, however, it may take some time before the LSA updates and the server is removed from the directory service. Most data center applications already provide a health service that monitors the servers (e.g., AutoPilot, see "Autopilot: Automatic data center management" by M. Isard, which is hereby incorporated by reference in its entirety), and the present system leverages this health service to quickly remove failed servers from the pools of servers that requests are load-balanced across.

In an alternate embodiment, the directory service is implemented by servers that are not directly involved in the operation of the network control plane. In this embodiment, the servers are informed of the mappings between IP addresses, top-of-rack switch addresses and intermediate switch addresses as part of a provisioning process, configuration process, or via the registration of servers with the DHCP system.

The directory service can also be used to implement security policies (e.g., for isolating applications from each other) by disallowing the resolution of certain IP addresses by certain servers.

Given the scale, cost and importance of emerging cloud service data centers, it is incumbent on the networking community to rethink the components and overall architecture of their networks. Components of these data centers include: powerful multi-core servers with Gigabit speed network ports at remarkably low price points; distributed systems that automate the configuration and management of hundreds of thousands of servers and switches; and all of this under a single organization's control. Together, these factors open up the opportunity for fundamental change to servers and switches internal to the data center, while still maintaining an external IP interface. Unfortunately, the prevailing data center network architecture (FIG. 1) falls short of realizing the full benefits of these components. In particular, in today's cloud services data centers, network and server capacity is fragmented, and bisection bandwidth is one to two orders of magnitude below aggregate server bandwidth.

In the present system, a network design is provided that leverages the power of emerging data center components. The ability to put networking functionality into hosts is exploited to realize disaggregated scalable load balancing on commodity servers, as well as ancillary network health monitoring and directory services. With functionality thus refactored, the control plane and data plane may be scaled to support a huge layer 2 switching domain providing full bandwidth between all servers in the data center.

An important design goal for data center interconnect and traffic engineering is to support arbitrary traffic patterns among all servers in the data center subject to server line card ingress/egress constraints (which is currently 1 Gbps). This means that concurrent flows may exist between any pair of servers at any given time so long as the total traffic entering or exiting a server is at most 1 Gbps. This traffic variation model, also known as hose traffic model (see "A flexible model for resource management in virtual private networks" by N. G. Duffield, P. Goyal, A. G. Greenberg, P. P. Mishra, K. K. Ramakrishnan, and J. E. van der Merwe, which is hereby incorporated by reference in its entirety), has been considered in the literature in the context of ISP backbone design (e.g., specifying the traffic requirements of a Virtual Private Network (VPN)). To route traffic in the hose model, some concrete interconnection topologies are set forth herein that take switch port counts into consideration together with oblivious routing strategies that guarantee throughput to hose traffic without the need to measure traffic in real-time or reconfigure the network in response to it.

The present design uses a simple mesh-like architecture, commodity switches, modifications to the control plane to control protocol overheads (e.g., from ARP) and to support flexible traffic engineering through multipath routing (See, "A scheme for fast parallel communication", SIAM Journal on Computing" by L. G. Valiant, which is hereby incorporated by reference in its entirety). It disaggregates the function of load balancing into a group of regular servers, with the result that load balancing server hardware can be distributed amongst racks in the data center leading to greater agility and less fragmentation. The architecture creates a huge, flexible layer 2 switching domain, supporting any server/any service, full mesh agility, and unfragmented server capacity at low cost.

Interconnect Topology Construction

The following constructions produce a very high throughput network, through the interconnection of smaller switching nodes. The fabric provides very high agility and very high efficiency—meaning the fabric allows high speed transfers to take place from any node to any other node, regardless of node location. Moreover, any service can be supported on any node, and that service can be migrated dynamically to other nodes. Advantageous properties of these constructions include:

Support for arbitrary traffic mixes and matrices, at full rate. Specifically, the n node fabric can be used to support any traffic matrix T with $\Sigma_j T_{i,j} < c_i$ and $\Sigma_i T_{i,j} < d_j$, where $T_{i,j}$ is the demand from node i to node j of the plurality of nodes, $c_i$ is the maximum rate at which node i can successfully send traffic and $d_j$ is the maximum rate at which node j can successfully receive traffic.

Support for a wide set of node and link failures, with small impact to the surviving fabric and graceful degradation of service bandwidth, through either adaptive adjustment of the routing scheme or the action of (re)randomizing the selection of addresses for the destination servers, top-of-rack switches, or intermediate switches.

Support for multi-path routing, either through random or hash-based load spreading mechanisms, or through traffic engineering mechanisms.

Support for TCP friendly behavior, meaning packet reordering events are rare.

Support for ingress/egress traffic into and out of the switching fabric.

Support for load balancing of traffic across arbitrary groups of nodes.

Integration of automated network and systems management.

The building blocks are nodes of at least two types:

Type 1: degree d1, speed s1 (i.e., d1 bi-directional ports, with each port running at speed s1 in each direction).

Type 2: degree d2, speed s2 (i.e., d2 bi-directional ports, with each port running at speed s2 in each direction).

In general, Type i: degree di, speed si (i.e., di bi-directional ports, with each port running at speed si in each direction).

Type 1 nodes are assumed to provide access; i.e., to source and to sink traffic—these have some number p of ports on the access side running at access speeds. Type 2 (or higher) nodes are assumed to act as transit between type 1 nodes.

In the network formed by type 1 and type 2 nodes, any of a plurality of routing algorithms can be used. Three types of routing algorithms which may be used are:

Shortest Path Forwarding (SPF): a route between node i to node j follows a shortest path from i to j under a given metric associated with the links.

Valiant load balancing (VLB): a route between node i to node j is chosen by first determining an intermediate node k and then routing i to k followed by k to j. To provably obtain high throughput, it is advantageous to spread traffic from i to j over a large number of paths. Accordingly, k may be chosen through a pseudo-random hash of the traffic flow id (non-volatile components of the TCP/IP header). SPF may be used to route from i to k and from k to j. Traffic split ratios to different intermediate nodes k could be equal or unequal.

Traffic Engineering (TE): routes may be chosen through consideration of one of traffic matrix and the network topology (through measurement, for example), and an optimization procedure, so as to split traffic between each node pair i,j along paths from i to j. This may be done, for example, through optimization (e.g., multi-commodity flow optimization) producing a routing that need not take shortest paths, or alternatively through tuning of SPF weights and use of SPF.

Assume there are n1 nodes of type 1 and n2 nodes of type 2, and thus a total of n=n1+n2 nodes. Relationships may be stated among parameters as follows:

The construction works as follows. The two node types may be viewed as logically arranged around a circle. (This circle has nothing to do with physical layout—it is merely a convenient device for describing how edges are placed in the network. The physical layout is arbitrary.) Add links between nodes as follows:

1. Connect each node to nodes i−1 and i+1 mod n.
2. Connect each node to other nodes in increments of n/(d1−2) positions away around the circle (mod n). This uses degree d1 at each node of both types and consumes all links of type 1 nodes.
3. Repeat step 2, considering just the smaller embedded ring of type 2 nodes, and connecting each type 2 node to other type 2 nodes in increments of n2/(d2−d1) positions away around the circle (mod n2). This consumes all links of type 2 nodes.

A generalization on steps 1,2 is to use any d1-regular (connected) graph topology in the first layer. Other specific examples include: (i) connect each node to nodes up to d1/2 positions away in either direction around the circle, (ii) (d1/2)-dimensional torus if the number of nodes is a d1-th power. Similarly, step 3 can be generalized for the interconnection among type 2 nodes.

A variation of the construction can be used where all links are bi-partite—that is between type (1) and type (2). This leads to the optimized VLB interconnect in the second example below described with respect to FIG. 8. In that example, a version is also provided which uses 144-port switches for type (1) and type (2) switches. The third example of FIG. 9, which is a variation of the second example, allows scaling up to 200,000 servers for interconnection.

A convenient way to think of the construction is that the n nodes are first embedded (randomly or regularly) in a regular 2 dimensional lattice of dimension d1, and then the type 2 nodes are embedded (again, randomly or regularly) in another regular 2 dimensional lattice of dimension d2−d1. The type 2 nodes provide "short cuts" through the original lattice.

The lattice can be created with considerable flexibility for growth, by leaving holes in the embedding, and by realization through nodes of slightly larger degree d1' and d2' (d1<d1' and d2<d2'), leaving spare ports for organic and simple accommodation of new nodes.

EXAMPLE 1

With Calculation

Figure 7:
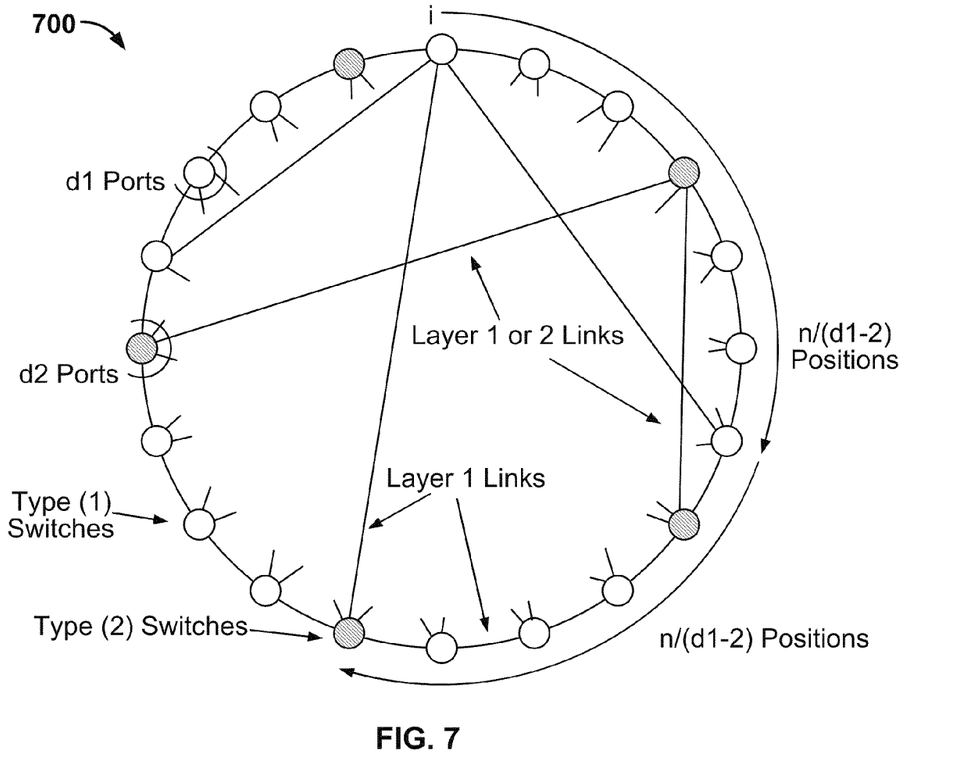
FIG. 7 is a diagram of an example interconnect topology.

Referring to FIG. 7, the following example shows an interconnect topology 700 allowing a full rate fabric in a 40,000 server data center. Using more concrete terminology, assume:

1. L2 access switches, of type (1), with p=20 10 G ports for access (facing top-of-rack switches), and degree d1=20 10 G ports on network side. There are n1=48 of these.
2. L2 transit switches of type (2), with degree d2=100 10 G ports (assume no access side ports for now). There are n2=24 of these.

Then, there is:
Total nodes=n=n1+n2
Average node degree d=(n1*d1+n2*d2)/n
Average (bidirectional) demand between a given pair of type (1) switches=(1/n)*(p+p)=2p/n, assuming either VLB or TE
Number of switch (1) pairs=n1*(n1−1)/2
Average (bidirectional) demand between a given pair of type (1) and type (2) switch=(1/n)*p (since type (2) switches do not have access)=p/n
Number of switch (1), (2) pairs=n1*n2
Total demand between above switch pairs=(2p/n)*n1*(n1−1)/2+(p/n)*n1*n2=(p/n)*n1*(n1+n2−1)
Average hop length of shortest paths can be approximated by sqrt(n/d).
Hence, total bandwidth-hops used (units of 10 G)=(p/n)*n1*(n1+n2−1)*sqrt(n/d)
Number of 10 G links in network=n*d/2
Hence, average link utilization=[(p/n)*n1*(n1+n2−1)*sqrt(n/d)]/(n*d/2) (which should be less than 1 to support full rate any to any traffic matrices).

These are average numbers. To obtain exact numbers, parameters may be chosen to determine the routing and the split ratios for VLB and TE.

Assuming a 10 Gport costs $1K on average, the total cost is about $4.1M.

EXAMPLE 2

Optimized VLB Interconnect

Figure 8:
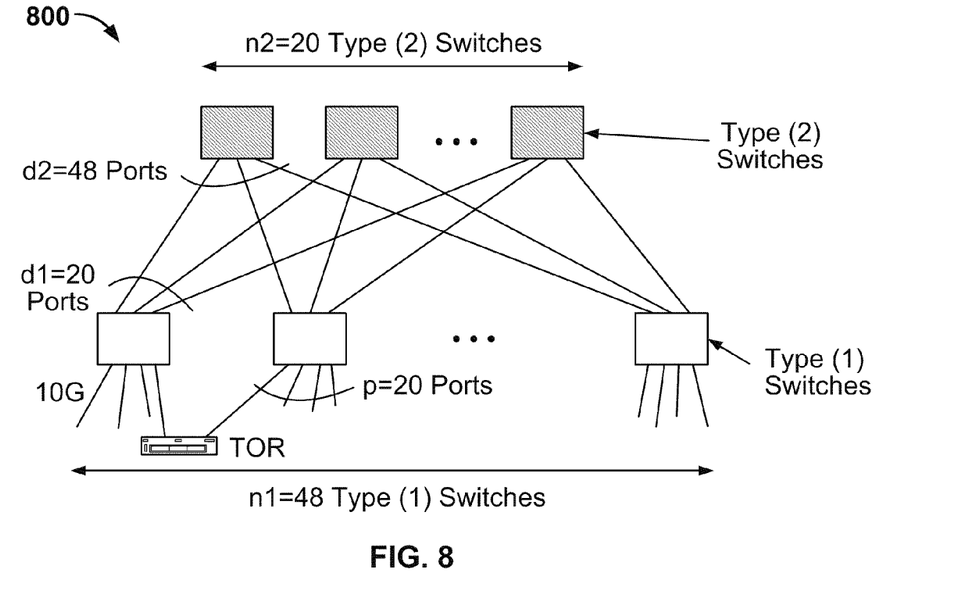
FIG. 8 is a diagram of an example interconnect topology.

Referring to FIG. 8, a simpler interconnect topology 800 may be gotten for this particular scenario (20×10 G hose) by optimizing VLB split ratios as follows.

1. Connect each type (1) node to n2=20 type (2) nodes using one 10 G port for each. (There are no links between two type (1) nodes or two type (2) nodes.)
2. Use VLB with split ratios of 1/20—each type (1) node splits to all n2=20 type (2) nodes.

Then, all links are fully utilized.
Ports on each type (1) node=20+20=40
Ports on each (2) node=48 (one to each type (1) node).
Total 10 G ports used=48*40+20*48=2880 (each 100% utilized)
That adds to about $2.9M (@$1K per port).
To compare with the earlier design, if each link utilization is reduced to 0.7 (comparing apples to apples), the result is 2880/0.7=4115 ports. That is about $4.1M (comparable with earlier design cost).

Referring again to FIG. 6 above, using 144-port switches for both type (1) and type (2), the following interconnection is obtained. This can support up to 144×36×20=103,680 servers.

EXAMPLE 3

Double Scaling the Optimized VLB Interconnect

Figure 9:
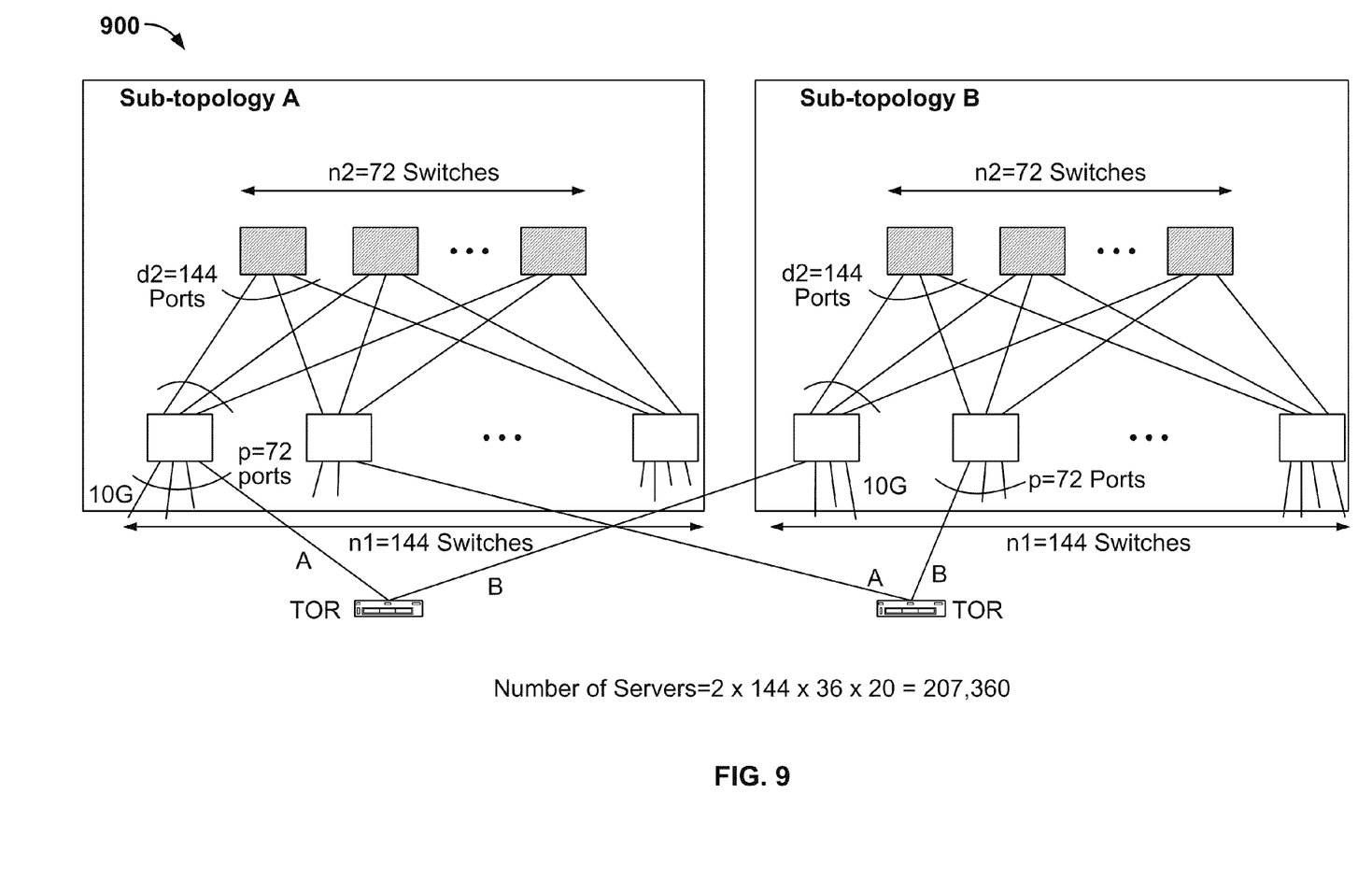
FIG. 9 is a diagram of double scaling the interconnect topology using 144-port switches.

Referring now to FIG. 9, by duplicating the topology discussed above in FIG. 6 and connecting each TOR to type (1) switches in different copies of the topology, the interconnect topology 900 may be scaled to 2×144×36×20=207,360 servers.

Routing and Traffic Engineering

An oblivious routing strategy may be illustrated based on Valiant load balancing for the topology shown and discussed above with respect to FIG. 6. Consider an end-to-end flow between two servers entering the network at TOR-A and exiting TOR-B. This flow follows the path TOR-A→Type (1) switch (connected to TOR-A)→Type (2) switch→Type (1) switch (connected to TOR-B)→TOR-B in the network. Conceptually, flows entering the network at a given TOR are split in the ratio 1/n2=1/72 to each intermediate node type (2) switch. It can be verified that such a split ratio leads to complete utilization of all 10 G links in the network when each server line card ingresses/egresses traffic at full line rates of 1 G.

To prevent packet-reordering (and its potential impact on TCP performance), each flow can be hashed to an intermediate node (based on the 5-tuple flow identifier, for example). To hide server addresses in the core network and to implement the two-phase routing as above, two levels of encapsulation/tunneling (see, for example, RFC 2003 or the IEEE 802.1ah standard, http://www.ieee802.org/1/pages/802.1ah.html, which are hereby incorporated by reference in their entirety) is used for forwarding packets in the core network.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An interconnection topology system for a data center, comprising:
    a plurality of servers in the data center;
    a plurality of nodes of a network in the data center through which data packets may be routed; and
    a routing scheme used in the data center where the routing is oblivious to the traffic pattern between nodes in the network;
    wherein the interconnection topology contains a plurality of paths between one or more servers;
    wherein a route between a node i to a node j is chosen by first determining an intermediate node k and then routing i to k followed by k to j, the node k being randomly chosen; and
    wherein a packet is modified using encapsulation to direct the packet to the selected intermediate node.

2. An interconnection topology system of claim 1, further comprising a component on one of a server or a node that contributes to the routing scheme by the component limiting traffic traversing the component so as to prevent sustained overload on any link of the paths taken by the traffic.

3. An interconnection topology system of claim 2, wherein the traffic limiting component is TCP.

4. An interconnection topology system of claim 1, further comprising a directory service, wherein packets sent by a server without specific routing instructions are directed to an intermediate node k, the node k consulting the directory service to determine a destination server for the packet and a routing from k to j.

5. An interconnection topology system of claim 1, wherein k is chosen through a random or pseudo-random hash of non-volatile components of a TCP/IP header of the data packet.

6. An interconnection topology system of claim 1, wherein the routing scheme used is Valiant load balancing.

7. An interconnection topology system of claim 1, wherein the fraction of traffic sent to each intermediate node k is not the same for all nodes k.

8. An interconnection topology system of claim 1, wherein packets can go from i to j without passing through k if node k does not lie on the shortest path between i and j.

9. An interconnection topology system for a data center, comprising:
    a plurality of servers;
    a plurality of nodes through which data packets may be routed;
    a topology of switches providing a plurality of paths between the plurality of servers; and
    a routing scheme employing Valiant load balancing to allow data packet transfers to take place from any node to any other node, the routing scheme dividing traffic among the plurality of paths, the routing scheme selecting a route between first and second nodes by first determining an intermediate node and routing through the intermediate node.

10. An interconnection topology system of claim 9, the routing scheme being an adaptive routing scheme that chooses routes by considering at least one of a traffic matrix, congested links, the network topology and put together with an optimization procedure, so as to split traffic between intermediate nodes in unequal ratios.

11. An interconnection topology system of claim 9, further comprising at least one of a control plane and a directory service that adaptively adjust the routing scheme in the event of node or link failure by causing data packets to avoid switches or links that have failed.

12. An interconnection topology system of claim 9, further comprising a directory service wherein the source of the packet or a switch on the path of the packet uses the directory service to identify one or more addresses of servers appropriate to receive the packet.

13. An interconnection topology system of claim 12, wherein the directory service provides addresses used in constructing a data packet, the addresses specifying at least one of an intermediate or destination node, switch, or server.

14. An interconnection topology system for a data center, comprising:
- a plurality of servers in the data center;
- a plurality of nodes through which data packets may be routed; and
- a routing scheme allowing data packet transfers to take place from any node to any other node, the routing scheme including:
  - a directory service for providing routing information to reach a destination server,
  - an agent for looking up at least one of a destination address or switch address for each data packet using the directory service, and
  - an encapsulator that modifies data packets so that they pass through at least one of a destination server or an intermediate switch.

15. An interconnection topology system of claim 14, the encapsulator selecting different intermediate nodes to spread load without causing packet reordering.

16. An interconnection topology system of claim 14, the routing scheme using Valiant load balancing wherein no node is asked to send or receive more traffic than its network interface can support at a given time.

17. An interconnection topology system of claim 16, wherein the intermediate node through which a data packet is routed is chosen through a random or pseudo-random hash of non-volatile components of a TCP/IP header of a data packet.

18. An interconnection topology system of claim 14, the routing scheme between source and destination nodes following a shortest path between the source and destination nodes under a given metric associated with the links between the plurality of nodes.

* * * * *